(12) United States Patent
Bhatia et al.

(10) Patent No.: US 7,330,721 B2
(45) Date of Patent: Feb. 12, 2008

(54) METHOD AND SYSTEM FOR SUPPORTING NON-INTRUSIVE AND EFFECTIVE VOICE COMMUNICATION AMONG MOBILE USERS

(75) Inventors: Randeep Bhatia, Green Brook, NJ (US); Hans Johansson, New York, NY (US); Jorge Lobo, New York, NY (US); Sharad Sharma, Madison, NJ (US)

(73) Assignee: Cisco Technology, Inc., San Jose, CA (US)

( * ) Notice: Subject to any disclaimer, the term of this patent is extended or adjusted under 35 U.S.C. 154(b) by 784 days.

(21) Appl. No.: 10/431,651

(22) Filed: May 7, 2003

(65) Prior Publication Data

US 2004/0002329 A1 Jan. 1, 2004

Related U.S. Application Data

(60) Provisional application No. 60/378,378, filed on May 7, 2002.

(51) Int. Cl.
*H04Q 7/20* (2006.01)
*H04Q 7/22* (2006.01)
*H04M 11/04* (2006.01)
*H04M 11/10* (2006.01)
*H04M 3/42* (2006.01)
*H04M 9/00* (2006.01)

(52) U.S. Cl. .............. 455/422.1; 455/413; 455/414.1; 455/415; 455/401; 455/403; 455/567; 455/412.2; 455/417

(58) Field of Classification Search .. 455/456.1–456.6, 455/401, 403, 404.1, 404.2, 412.1, 412.2, 455/413, 466, 414.1–414.4, 415–417, 457–463, 455/517–519, 550.1, 552.1, 556.1–556.2, 455/553.1, 565–567, 411, 419, 422.1, 456.4, 455/428, 560; 379/201.07–201.11, 210.01, 379/210.02, 210.03, 100.05, 100.06, 142.01, 379/142.02, 142.03, 88.2, 164, 249, 201.02, 379/93.32
See application file for complete search history.

(56) References Cited

U.S. PATENT DOCUMENTS 5,572,585 A 11/1996 Tsutsui ...................... 379/242

(Continued)

*Primary Examiner*—Meless Zewdu
(74) *Attorney, Agent, or Firm*—Baker Botts L.L.P.

(57) ABSTRACT

A system and related method for supporting non-intrusive and effective voice communication among mobile users in which voice calls between mobile users are managed based on callee availability, caller-callee relationships, and non-intrusive information exchange, including interactive exchange at the time of call setup but prior to the call being answered. Callee availability can be based on callee device status, calendar activities, location, past behavior and other factors. The caller-callee relationships specify whether the callee is available, unavailable or on restricted availability relative to the caller. The interactive exchange can be implemented using voice and/or text/graphic displays on caller and callee mobile device. Callees are provided with options for handling the call. Callers are provided with information regarding the callee's current and future availability and willingness to receive a voice call from the caller, thus maximizing the chance of caller reaching the callee on every voice call.

29 Claims, 6 Drawing Sheets

U.S. PATENT DOCUMENTS

| | | |
|---|---|---|
| 5,878,338 A | 3/1999 | Alperovich et al. ........ 455/417 |
| 5,943,397 A * | 8/1999 | Gabin et al. ............... 379/67.1 |
| 5,946,386 A | 8/1999 | Rogers et al. .............. 379/265 |
| 6,038,305 A | 3/2000 | McAllister et al. ......... 379/207 |
| 6,148,193 A * | 11/2000 | Miska et al. ................ 455/410 |
| 6,167,119 A | 12/2000 | Bartholomew et al. .. 379/88.04 |
| 6,175,616 B1 * | 1/2001 | Light et al. ............. 379/88.14 |
| 6,208,854 B1 | 3/2001 | Roberts et al. ............. 455/417 |
| 6,249,815 B1 | 6/2001 | Foladare et al. ............ 709/223 |
| 6,374,102 B1 * | 4/2002 | Brachman et al. .......... 455/422 |
| 6,671,508 B1 * | 12/2003 | Mitsuoka et al. ......... 455/412.1 |
| 2003/0112945 A1 * | 6/2003 | Brown et al. .......... 379/201.01 |
| 2003/0206619 A1 * | 11/2003 | Curbow et al. ........ 379/210.01 |

* cited by examiner

METHOD AND SYSTEM FOR SUPPORTING NON-INTRUSIVE AND EFFECTIVE VOICE COMMUNICATION AMONG MOBILE USERS

CROSS REFERENCE TO RELATED APPLICATIONS

This application claims the benefit under 35 U.S.C. 119(b) of U.S. Provisional Patent Application Ser. No. 60/378,378, filed on May 7, 2002, entitled "Method and System for Supporting Non-Intrusive and Effective Voice Communication Among Mobile Users."

BACKGROUND

1. Field of Invention

The present invention relates to the provision of effective voice communication among mobile users, and particularly the management of voice calls between mobile wireless devices.

2. Description of Prior Art

Mobile devices are becoming ubiquitous. People carry them to meetings, use them out of the office, in social situations, and in other settings where wireless communication is needed. Incoming voice calls to mobile devices can be intrusive under certain situations. It is therefore desirable to allow callees to screen calls and decide in advance whether the calls warrant answering. Caller ID service is conventionally available to provide a callee with limited information about a call for call screening purposes, with the callee usually having very few options to manage the call. In particular, for most callees, the only available actions are to accept the call or decline it by either not answering or allowing an answering machine or voice mail system to respond. The caller in such cases, has no control over whether or not the call will be accepted.

More advanced Caller ID services can provide the callee with limited interaction with the caller to assist the call screening process, thereby giving both the caller and the callee more control over the call. However, despite the limited interaction, the caller still has no effective way of knowing when the callee is willing to accept their call.

There are models and mechanisms such as those defined by the Presence and Availability Management (PAM) standards that allow a caller to discover the willingness of a callee to receive a call. PAM provides a set of APIs that a caller's mobile application software can use to check for the availability of a callee. However, PAM is not able to enforce or guide the caller on how to proceed after the availability information is obtained. Mobile applications that make use of PAM servers need to be built to afford access to the availability data by the final user, the caller.

SUMMARY OF THE INVENTION

The invention addresses the foregoing concerns by combining the basic concept of caller ID with the general model of Presence and Availability Management in a novel system and related method for supporting non-intrusive and effective voice communication among mobile users in which voice calls between mobile users are managed based on callee availability, caller-callee relationships, and non-intrusive information exchange, including interactive exchange at the time of call setup but prior to the call being answered.

BRIEF DESCRIPTION OF THE DRAWING FIGURES

The foregoing and other features and advantages of the invention will be apparent from the following more particular description of preferred embodiments of the invention, as illustrated in the accompanying Drawings in which.

DETAILED DESCRIPTION OF EXEMPLARY EMBODIMENTS

Figure 1:
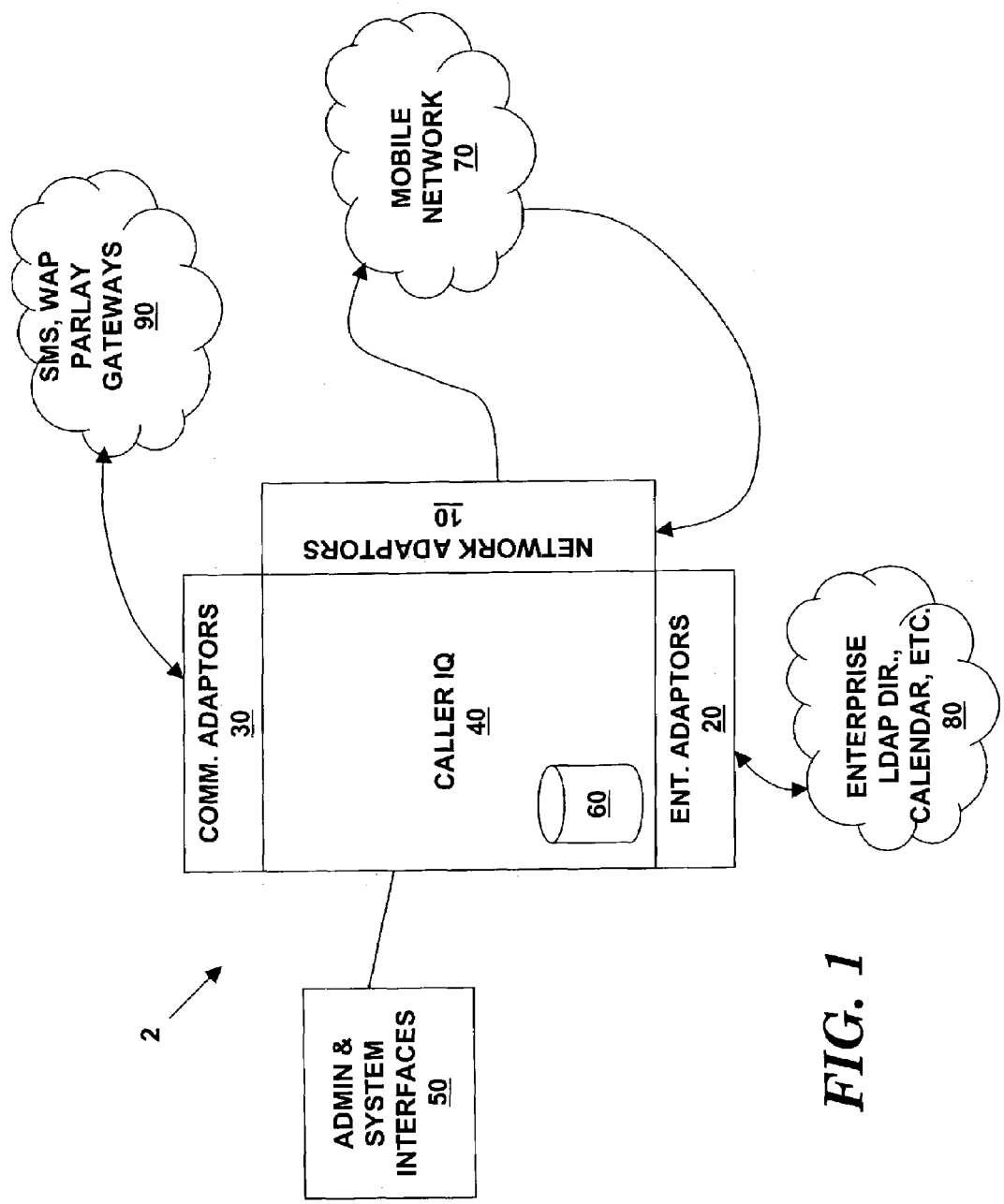
FIG. 1 is a network topology view showing a Caller IQ system constructed in accordance with the invention.

Turning now to FIG. 1, a Caller IQ server (2) can be constructed to provide non-intrusive and effective voice communication among mobile users. The Caller IQ server (2) includes a set of network adapters (10), a set of enterprise adaptors (20), a set of mobile data and voice communication adaptors (30), a Caller IQ engine (40), a set of administrative and system interfaces (50), and a database (60).

In general, the functions of the foregoing components may be summarized as follows: The network adaptors (10) are adapted to access different mobile network components (such as Home Location Registers (HLRs), Gateway Mobile Location Centers (GMLCs), etc.) in a mobile network (70). Although not shown in FIG. 1, the network (70) is assumed to include one or more mobile devices, such as cellular telephones, personal digital assistants (PDAs), laptops, etc. These devices will have any of various device level applications that communicate directly with the network adapters (10). Some of the devices may also have resident modules, such as Subscriber Interface Module (SIM) cards, running applications such as a SIM Tool Kit (STK). The Enterprise adapters (20) interact with external enterprise or application service provider services, such as Lightweight Directory Access Protocol (LDAP) directories, calendar services, mail servers, etc., in a network (80) (e.g., the Internet). The communication adapters (30) interact with a network (90) of mobile service entities (90), such as Wireless Application Protocol (WAP) gateways, Short Message Service (SMS) gateways, Unstructured Supplementary Service Data (USSD) gateways, Interactive Voice Response (IVR) systems, etc. The Caller IQ engine (40) manages provisioning and caller/callee interactions. The administrative and system interfaces (50) allows administrative access to the Caller IQ server (2). The database (60) stores subscriber information.

As described in more detail below, the Caller IQ server (2) is adapted to implement non-intrusive incoming voice call management/screening, preferably using text/graphic displays (hereafter referred to as call pop-ups) on a callee's mobile device if such capability is provided by the device. Based on a callee's past behavior and presence data, such as device status, calendar activities, location, etc., callers are provided with indicators regarding a callee's current and future availability and willingness to receive a voice call from the caller, thus maximizing the chances of the caller reaching the callee on every call.

As in other Presence and Availability Management (PAM) systems, the Caller IQ server (2) allows subscribers to specify preferences as to how they become available to other users for voice calls based on their (and their mobile device's) current status, such as busy, in a meeting, out of office, etc. Subscribers can also publish or allow other users to view their current (and future) availability status, either explicitly or automatically from their calendar using network state information (e.g. location, device status etc.), or otherwise. These availability indicators help reduce intrusion on callees and enable callers to maximize their chances of successful call completion on every voice call.

The Caller IQ server (2) is capable of automatically screening and managing voice calls based on the current (un)availability of callees relative to callers. In addition, callers and callees can interact with the Caller IQ server (2) for screening and management of a call, at the time of call setup but before the call is answered. During such interaction, callees are provided with enough context information to make a decision on how to screen and manage incoming calls. Based on the capability of the callee and caller client devices, the Caller IQ server (2) uses the least intrusive user-preferred mechanism, such as text or graphic call pop-ups.

In situations where a callee is not currently able to take an incoming call, but would prefer to speak with the caller at a later time, the Caller IQ server (2) provides the caller with various options such as setting callback reminders and for reserving a "talk slot" on the callee's calendar at the earliest mutually convenient time (based on the schedule of the two users). In the last case, the caller can be notified of any change in the callee's ability to remain committed to the "talk slot" (e.g. running behind schedule, something more important came up etc.). Based on the availability indicators provided by the Caller IQ server (2), the caller can set availability change alerts to automatically receive notification when the callee publishes their availability to accept calls. By minimizing interaction with the caller and the callee, the Caller IQ server (2) is able to renegotiate the earliest time to the next "talk slot" at which the callee is able to call the caller and the caller is willing to accept the call with minimal intrusion.

The Caller IQ server (2) incorporates an adaptation mechanism that, based on the history of past behavior of the callee and the caller, is able to provide to the callee the most relevant call screening/management option for a given incoming call to minimize the amount of interaction with call pop-ups. The adaptation mechanism is made least intrusive by minimizing the number of interactions with the callee, and by automatically call screening/managing many incoming calls. It is also able to learn, based on the interaction with the callee during call management and screening, the most accurate availability indicators of the callee towards other users without requiring the callee to explicitly publish his/her availability for each user to the Caller IQ system.

The Caller IQ server (2) enhances existing mobile telephony services such as Call Waiting with interactive text/graphic presentation on a handset. A mobile subscriber with Call Waiting service is able to receive notification for an incoming call while busy on another call, and is able to switch between the two calls. On the arrival of a second call when the first call is in progress, the Caller IQ server (2) lets the callee screen and manage the new call via text or graphics call pop-ups and after deciding to accept the second call is able to switch between the two calls.

Subscribers of the Caller IQ server (2) are able to provision their current availability status into the system. This can be done either manually via a mobile handset, or with data input via the Enterprise adapters (20) from applications such as calendars, network presence servers, location data servers, etc. The latter can be downloaded from public or private directories or databases. For example, as indicated above, some of the Enterprise adaptors (20) can be designed to interact with LDAP directory servers or the like. In addition, some of the Enterprise adapters (20) can take the form of client applications given to individual subscribers to install in their personal computers that communicate directly with the Caller IQ server (2). This class of adapters can be used to download into the Caller IQ server (2) the contact list information of individual subscribers, as well as other information such as calendar data that might be stored in the personal computer of the user.

In the Caller IQ server (2) described herein, it will be assumed for purposes of example only that the availability status of the subscriber can be free, busy or away (e.g., out of the office). The free status can be the default status of the subscriber and entries in the subscriber's calendar such as meetings can change the status to busy. A travel entry in the subscriber's calendar (or in a location server, etc.) can be used to detect when the subscriber is not in the office and to switch the subscriber's status to out of the office.

A subscriber's current availability status is maintained in the database (60). For each subscriber, the database (60) can also maintain a list of callers having assigned caller statuses, such as (1) the subscriber is always available to this caller, (2) the subscriber is on restricted availability relative to this caller, or (3) the subscriber is unavailable for this caller. Callers who are not listed can be assigned a default status. Based on these possible statuses, a subscriber can differentiate his or her availability to the potential callers. For example, when the subscriber is free, s/he could be available for all callers in his or her contact list, but s/he might be on restricted availability to all other callers. If the subscriber is busy, s/he could be available to his/her boss or other important individuals, on restricted availability for members of her/his family contact list, and unavailable for all other callers. Subscribers can implement these settings through the administrative interfaces (50), which can be accessed via the World Wide Web or using other network resources and protocols. Alternatively, or in addition, default settings can be assigned by the system and subscribers may let the system reclassify callers in different categories based on how the subscribers use the system, as explained in more detail below.

Figure 2:
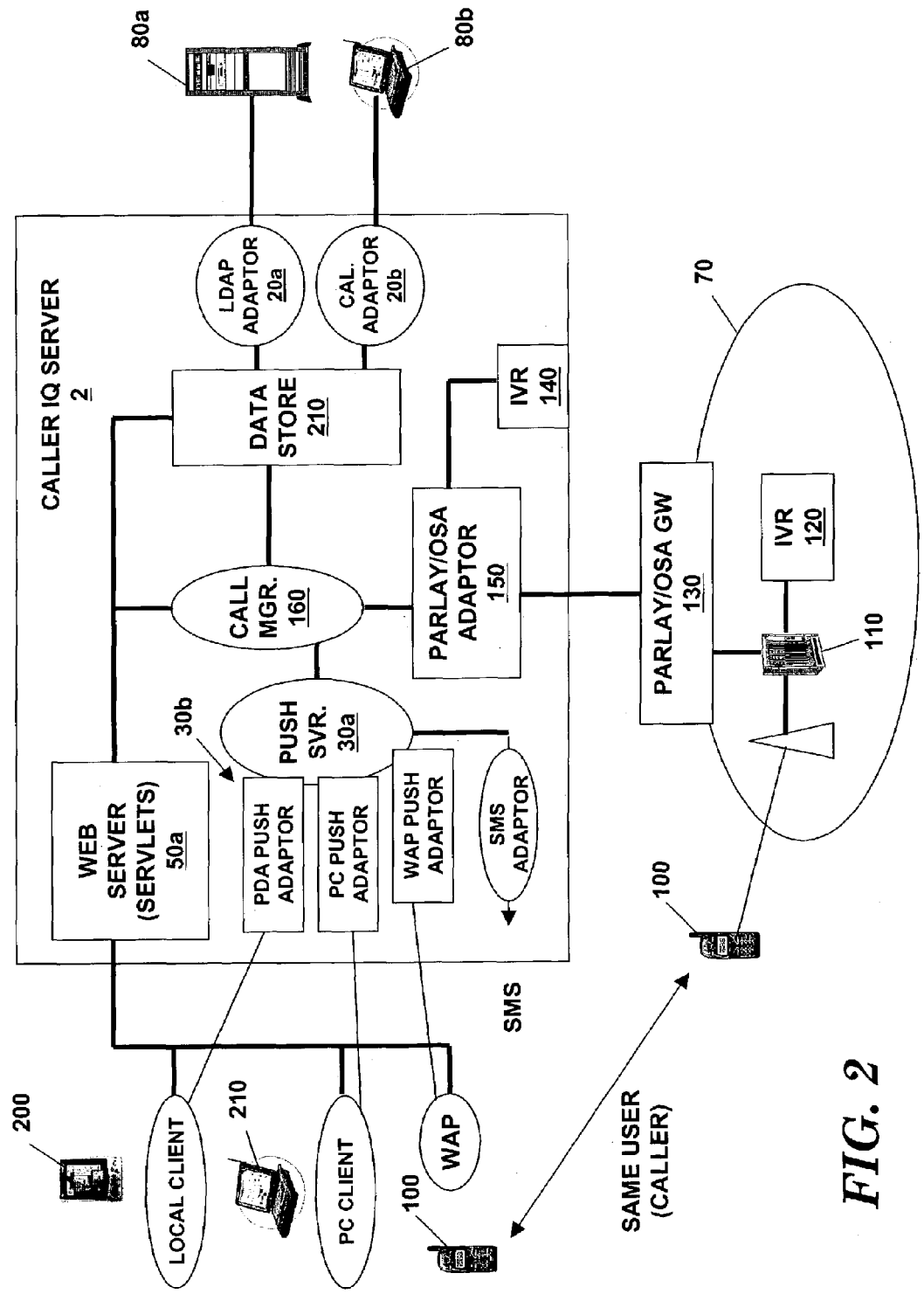
FIG. 2 is a functional block diagram showing exemplary internal components of a Caller IQ server component of the invention.

FIG. 2 shows further details of the Caller IQ server (2) and illustrates the manner in which the server interacts with the outside world. At the heart of the Caller IQ server (2) is a call manager (160) that implements the Caller IQ engine (40) of FIG. 1. The enterprise adaptors (20) are shown to include an LDAP adaptor (20a) for communicating with an LDAP server (80a), and a Calendar adaptor (20b) for communicating with a calendar application on a subscriber's computer (80b).

The communication adaptors (30) are shown to include a push server (30a) adapted to send caller-callee interaction information to caller and callee devices, and receive response information back from these devices (e.g., via SMS). Various protocol adaptors (30b) are also shown for supporting device-specific communications on behalf of the push server (30a). These include a PDA push adaptor for communicating with a callee's mobile device (200), a PC push adaptor for communicating with a callee's personal computer (210), a WAP push adaptor for communicating with a caller's mobile device (100) and an SMS adaptor for SMS communication with the mobile device (100). A Web Server (50a) functions as the administration and system interface (50) for the Caller IQ Server (2). It runs one or more servlets or other server-side software for (1) processing subscriber provisioning information, (2) publishing callee availability, and (3) sending/receiving caller-callee interaction information to/from caller and callee devices.

The Caller IQ server (2) is also shown in FIG. 2 to include a conventional Parlay/OSA (Open Services Access) adaptor (150) that allows the server (2) to interface with a Mobile Switching Center (MSC) (110) in the mobile network (70) via a conventional Parlay compliant/OSA gateway (130). A conventional IVR system (120) is provided in the mobile network (70). In addition, the Caller IQ server (2) includes its own IVR (140) that can be programmed through the Parlay/OSA adaptor (150). A data store (210) maintains the database (60) of FIG. 1 and is connected to the Web Server (50a) to receive subscriber provisioning information.

Figure 3:
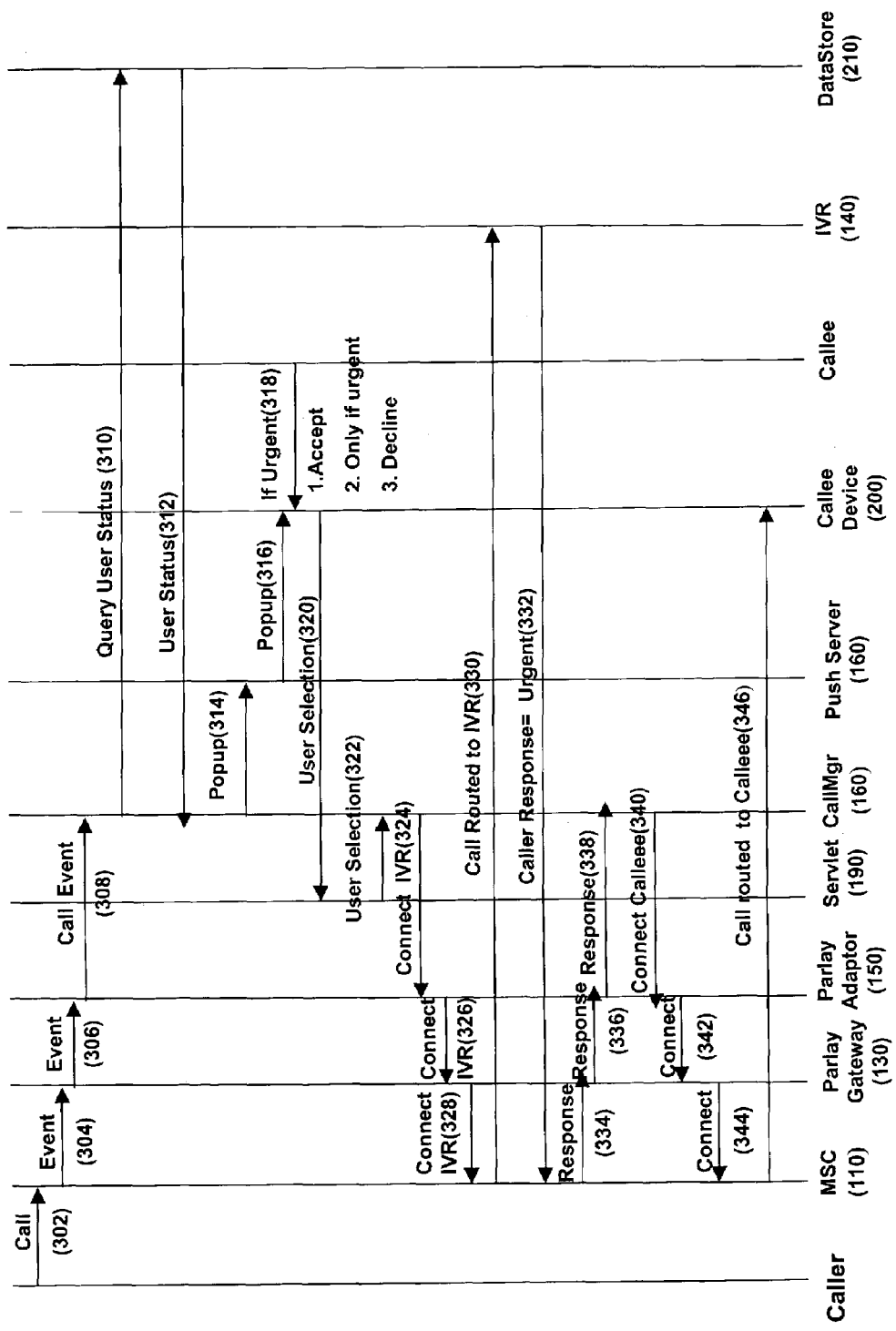
FIG. 3 is a flow diagram showing how messages can be passed among the different components of the Caller IQ server in conjunction with mobile network resources.

Callers with appropriate devices/applications (i.e. devices/applications that can access the Caller IQ server (2) using WAP, SMS, USSD, HTML or otherwise) can check the availability of the person they are intending to call (the callee), and then decide to make a call. By way of example, the caller device (100) in FIG. 2 can be used for this purpose because it is both WAP-enabled and SMS-enabled. If the caller makes a call, the Caller IQ server (2) will intercept it by trapping the call signaling in the MSC (110), either directly or indirectly using the Parlay compliant gateway (130). FIG. 3 shows this interaction. It also illustrates a basic Caller IQ scenario in which (1) the caller is deemed to be on restricted availability relative to a callee, (2) the callee is presented with several response options, including asking the caller whether the call is urgent, (3) the callee indicates that s/he only wants the call if it is urgent, (4) the caller indicates that the call is urgent, and (5) the call is connected. FIG. 3 shows the message flow of this Caller IQ scenario in a top-to-bottom sequence of steps numbered (302) through (346). The lower portion of FIG. 3 identifies the entities that participate in the message flow.

Describing now this flow in more detail, step (302) represents the calling device (100) initiating the call by going off hook, dialing the callee device (200 or 210 in FIG. 2) and connecting to the MSC (110). In step (304), the MSC (110) reports the call event to the Parlay Gateway (130), which in turn reports the call event to the Parlay Adaptor (150) in step (306), which notifies the Call Manager (160) of the call event in step (308). In step (310), the Call Manager (160) queries the DataStore (210) to determine the callee's user status, and the DataStore (210) responds in step (312). In step (314), the Call Manager (160) sends a pop-up request to the Push Server (30a), which in turn generates a pop-up message to the callee's device (200) in step (316). In step (318), the callee selects Action (2) ("Only if urgent"), and in step (320) the callee device (200) forwards the callee's selection to one of the servlets in the Web Server 50a. In step (322), the recipient servlet passes the callee selection to the Call Manager (160). In step (324), the Call Manager (160) sends an IVR connection request to the Parlay Adaptor (150) along with the callee's selection. In steps (326) and (328), the connection request and the callee's selection are forwarded to the Parlay Gateway (130) and then to the MSC (110). The MSC (110) sets up a call in step (330) between to the caller device (100) and the IVR (140) and the IVR play the callee's selection in step (332). The callee responds through the callee device (100) that the call is urgent, and this response is passed from the MSC (110) to the Parlay Gateway (130) to the Parlay Adaptor (150) to the Call Manager (160) in steps (334), (336) and (338). In step (340), the Call Manager (160) processes the response and sends a request for connection between the caller and callee devices to the Parlay Adaptor (150). The connection request is forwarded in steps (342) and (344) to the Parlay Gateway (130) and then to the MSC (110). In step (346), the MSC (10) sets up the call from the caller device (100) to the callee device (200).

Figure 4:
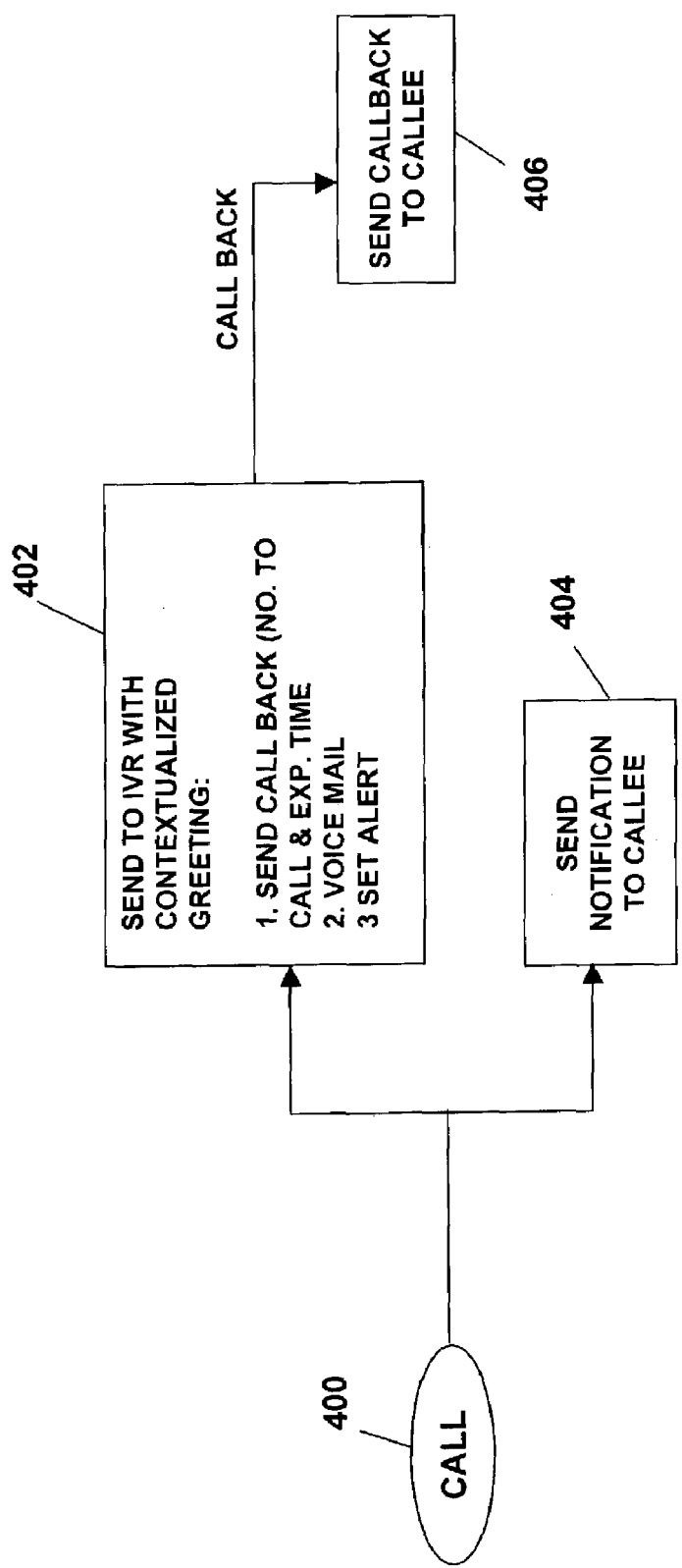
FIG. 4 is a flow diagram showing communication control logic in accordance with one caller-callee availability scenario that can be implemented by the invention.
Figure 5:
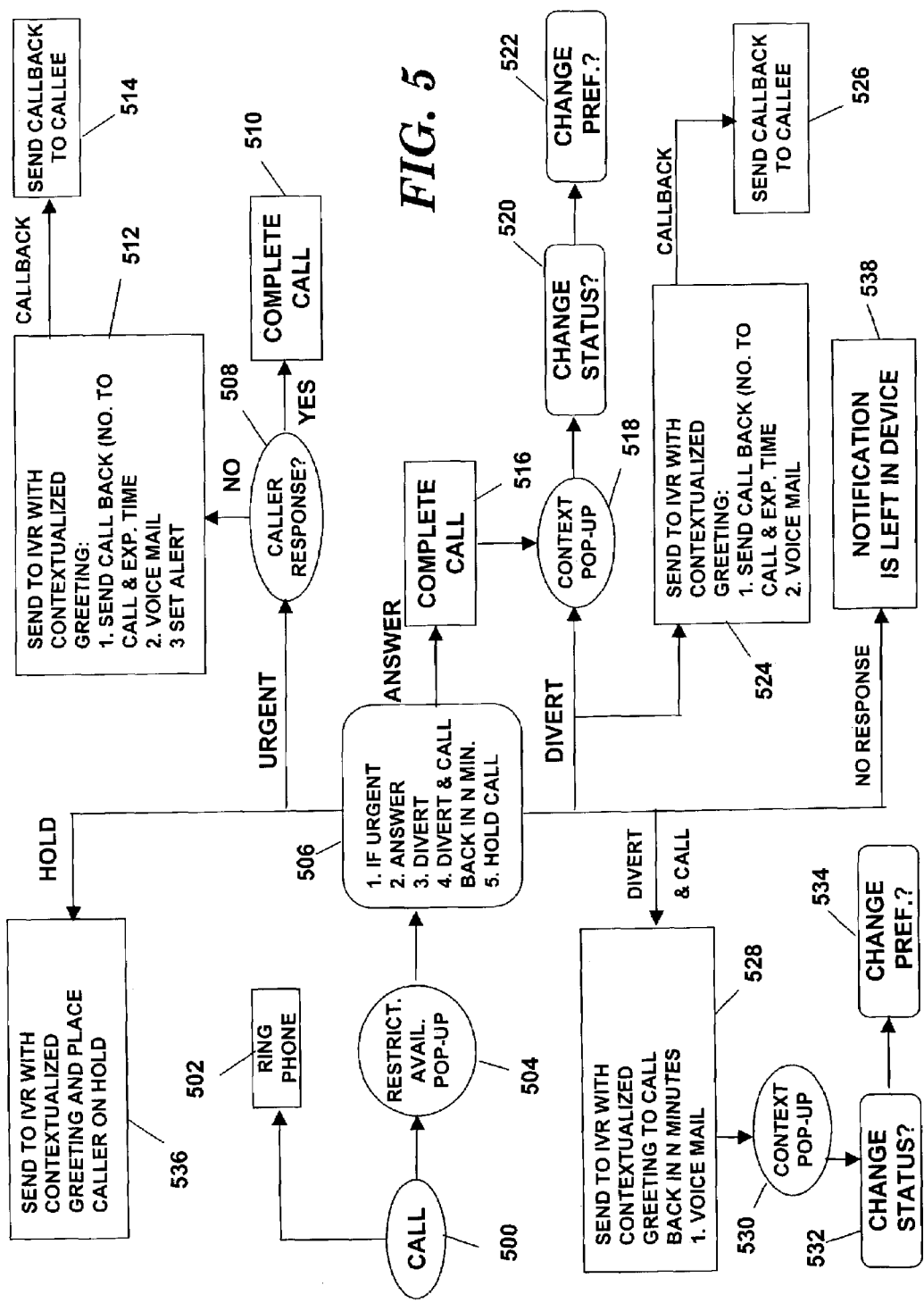
FIG. 5 is a flow diagram showing communication control logic in accordance with another caller-callee availability scenario that can be implemented by the invention.
Figure 6:
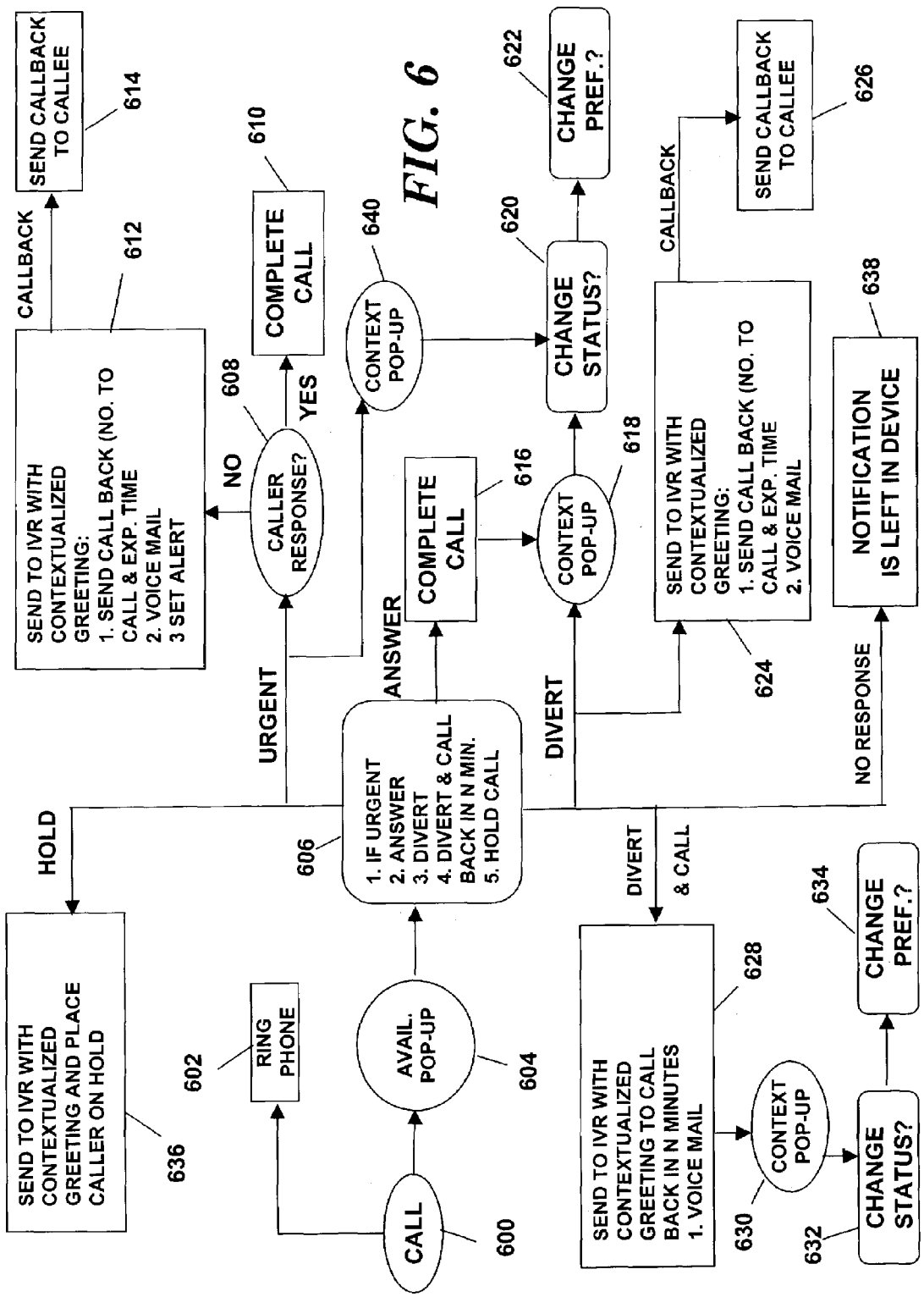
FIG. 6 is a flow diagram showing communication control logic in accordance with another caller-callee availability scenario that can be implemented by the invention.

FIGS. 4, 5 and 6 illustrate three additional Caller IQ scenarios that differ from one another according to the availability of the callee relative to the caller. These Caller IQ scenarios are respectively described below.

If the callee wants to be unavailable to the caller, the flow will be as shown in FIG. 4. In that case, a call (400) from the caller is transferred to the IVR system (140) by intersecting the call through access given by the Parlay/OSA gateway (130)). The IVR system (140) will greet the caller at (402) and advise that the callee is unavailable. The IVR system (140) can optionally let the caller know the status of the callee is "busy" and provide relevant calendar information (in a meeting until 1:00 PM). The IVR system (140) then offers the caller an action menu containing three actions (1), (2) and (3). Action (1) is to send a callback message to the callee requesting him/her to call back within certain amount of time at a given number. Action (2) is to allow the caller to leave a message in the voice mail of the callee. Action (3) is to set an alert that will let the caller know when the callee becomes available. In all three cases, the callee will be notified of the call at (404). Moreover, assuming the caller selects action (1), a callback message (406) is also sent to the callee. Depending on the capabilities of the caller's device, the caller's interaction with the Caller IQ system could alternatively take place through text or graphics messages instead of an IVR system. Moreover, depending on the caller and callee's device capabilities, pop-up menus could be used with options such as sending the caller the callee's e-mail back as an alternative communication channel. Another possibility would be to establish an Instant Messaging session between the caller and the callee. However, it must be borne in mind that the callee does not normally wish to be disturbed when his/her status is unavailable relative to the caller.

If the callee is on restricted availability mode to the caller, the interaction follows the flow diagram of FIG. 5. In this mode, when a call (500) is made the caller is allowed to interact with the callee, albeit non-intrusively, through the Caller IQ server (2). The callee's device (200) (see FIG. 2) must therefore have a suitable application installed, such as one that can display pop-up graphics. The call (500) will be passed directly to the callee at (502) if the Caller IQ server (2) notices that the callee's device (200) does not have the capability to handle the required interactions. This information can be captured when the device (200) connects to the network (70). The caller IQ server (2) can either poll the network (70) or receive a triggered event, depending on the capabilities of the network (70). This information will then be stored in the data store (210). The call (500) is also passed directly to the callee if the communication channels to conduct the interaction are malfunctioning.

Assuming the callee's device (200) has the required application and the Caller IQ server (2) is able to contact the device (200) via the call manager (160), the application will generate a pop-up (504) that displays a menu (506) in the callee's device (200) showing information about the caller (such as name, phone number, location if available, etc.) and the option to execute the following actions: (1) ask the caller if the call is urgent; (2) accept the call; (3) divert the call to the IVR system; (4) divert the call but pass to the IVR system information that will let the caller know an approximate time where s/he can try to call again; and (5) put the call on hold.

If action (1) is taken, the caller will be prompted at (508) by the IVR system (140) to say if the call is urgent. If the answer is yes, the call (500) is completed at (510) such that the callee's phone rings and the caller is connected. If the answer is no, the caller is greeted at (512) by an IVR message and offered the option of leaving a voice mail and setting a callback with the callee in the same form as for the previous case of an unavailable callee shown in the description of the flow diagram of FIG. 4. Assuming the caller selects action (1), the callee will be sent a callback message (514).

If the action taken by the callee in response to the menu (506) is (2), the caller is connected to the callee at (516). In addition, the callee is prompted at (518) either before or after the call finishes to consider a reclassification of the caller because only calls from callers to available callees are passed directly without no questions to the caller. Thus, as shown at (520), the caller can be moved to the category for which the caller is available relative to the callee. The callee also has the option to change her/his status because it may be the case that s/he is on restricted available mode to the caller. This could be due to the fact that the system has the callee in an out-of-date status (for example, the system designates the callee as busy because of a meeting scheduled in her/his calendar but the meeting was canceled at the last minute because the organizer of the meeting had an emergency). Thus, as shown at (522), the callee can reclassify her/his status on-the-fly so that subsequent calls are treated correctly.

If action (3) is taken by the callee in response to the menu (506), the caller is connected to the IVR system (140), where the caller is greeted at (524) and given the option to leave a voice mail message, send a callback message (526), or set availability alerts that will notify the caller when the callee becomes available to receive calls. As shown at (520 and 522), the callee has also the chance to reclassify the caller or change her/his status, this time by moving the caller to unavailable or changing her/his status to reclassify all callers. In this case, the incorrect classification could have occurred because the calendar had a one hour meeting scheduled but the meeting went overtime, the system changed the callee's status to free and the callee has the opportunity to change his/her status back to busy.

Action (4) of the menu (506) behaves similarly to action (3) except that the callee specifies a more likely time where s/he will be available to answer the call, and the IVR greeting (528) to the caller will be modified accordingly. In addition, the callee is prompted at (530) to consider a reclassification of the caller (532) or to change their own status (534) so that subsequent calls from this caller are treated correctly.

Action (5) of the menu (506) is for the callee to put the caller on hold. The caller will be automatically informed of this fact at (536) by the IVR system (140) (other information, such as calendar information, can also be added to the greeting) and it will be up to the caller to wait or drop the call.

There is also a sixth possible action. This action would occur if the callee does not respond to the call pop-up (the callee went out of the room for a moment and left the phone behind). The call will be treated as if it has been diverted by the callee under action (3). A notification (538) is left in the telephone of the callee showing that a call was missed.

The flow diagram of FIG. 6 covers the case when the callee is available to the caller. In this case the normal action is to accept the call. However, the same action menu described above relative to the restricted availability scenario of FIG. 5 is preferably presented. Thus, the events and actions designated by reference numerals 600-638 of FIG. 6 respectively correspond to the events and actions designated by reference numerals 500-538 of FIG. 5. Again, if either of actions (2), (3) or (4) are taken in response to the menu (606), the callee is prompted to either reclassify the caller or change her/his status to adjust his/her behavior to the default case. As shown by the additional pop-up (640), the same prompting is also provided if action (1) of the menu (606) is selected so that a change of the caller to restricted availability status may be considered.

Note that requests for a callee to reclassify callers or to change their own status can be driven by historical behavior. For example, if the callee in a previous call changed her/his status and the call has just occurred, the system might infer that the callee will not change the status again. In this case, the option may not be given or is given after the status change option. This can be done by observing the callee's behavior and predicting how s/he will act next. The system can also learn that the callee behaves randomly and decide to drop the status change requests most of the time.

It will be appreciated that there are alternative ways of presenting call pop-ups to a callee in addition to having a local client running in the callee device (200). The pop-ups can be presented as SMS messages or WAP pushed pages. Caller IQ service implementations may thus be adjusted to depend on the device capabilities. Similarly, use of the IVR system (140) to communicate with the caller can be replaced by a local client running in the caller's device (100) or through WAP pushed pages or SMS messages, or any other existing or yet to be developed method to communicate with mobile devices. For example, to capture responses from the callee or caller, personalized WAP pages can be generated with specific WAP links that correspond to the answer given to the IVR system.

The callee status modes described herein are presented as a way to describe the model. Other status modes can be introduced according to the subscribers using the Caller IQ service. For example, for a medical doctor, more granularity can be introduced to let the subscriber indicate statuses such as attending an emergency or being in the middle of an operation. Similarly, the availability modes can be more than three if the subscriber requires additional modes.

Accordingly, a method and system have been disclosed for supporting non-intrusive and effective voice communication among mobile users. While various embodiments of the invention have been shown and described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for supporting non-intrusive and effective voice communication among mobile users comprising:
managing voice calls between callers and callees based on callee availability, caller-callee relationships, and non-intrusive information exchange, including interactive exchange at the time of call setup but prior to a call being answered; and facilitating execution of a call-handling option, during the call setup and prior to the call being answered, according to a caller-callee relationship and the information exchange, said information exchange includes providing call handling options to said callee, wherein facilitating execution of the option comprises:

providing at least two options for handling a voice call, wherein said call handling options include setting a callback alert that alerts said caller when said callee becomes available, asking said caller if said call is urgent, answering said call, diverting said caller to an options menu that allows said caller to send a callback message or leave a voice mail message, diverting said caller to an options menu that advises said caller to callback within a specified time frame and allows said caller to leave a voice mail message, and placing said call on hold;

receiving a selection of an option; and facilitating execution of the selected option.

2. A method in accordance with claim 1 wherein said information exchange includes providing said caller with information regarding said callee's current and future availability and willingness to receive a voice call from said caller, and providing call handling options to said caller.

3. A method in accordance with claim 2, wherein said call handling options include sending a callback message to said callee and leaving a voice mail message.

4. A method in accordance with claim 1 wherein said call handling options include allowing said callee to change said callee availability and said caller-callee relationship.

5. A method in accordance with claim 1 wherein said information exchange includes one or more of interactive voice response menus, graphical menus and text menus.

6. The method of claim 1, further comprising determining a callee status indicator to determine call availability.

7. A method in accordance with claim 6, wherein the callee status indicator comprises a selected one of free, busy and away.

8. A method in accordance with claim 7 wherein said callee status indicators are based on one or more of callee mobile device status, callee calendar activities, callee location and past callee behavior.

9. The method of claim 1, further comprising determining a caller status indicator to determine the caller-callee relationship.

10. A method in accordance with claim 9, wherein the caller status indicator comprises a selected one of available, unavailable or restricted availability.

11. The method of claim 1, wherein said information exchange comprises providing call handling options to a caller.

12. The method of claim 11, wherein the call handling options comprise communicating a callback message to the callee, allowing the caller to leave a voice mail message, and setting an alert that informs the caller of a first status indicator of a callee.

13. A system for supporting non-intrusive and effective voice communication among mobile users, said system operable to:

manage voice calls between mobile users based on callee availability, caller-callee relationships, and non-intrusive information exchange, including interactive exchange at the time of call setup but prior to the call being answered; and facilitate execution of a call-handling option, during the call setup and prior to the call being answered, according to a caller-callee relationship and the information exchange, said information exchange includes providing call handling options to said callee, wherein facilitating execution of the option comprises:

providing at least two options for handling a voice call, wherein said call handling options include setting a callback alert that alerts said caller when said callee becomes available, asking said caller if said call is urgent, answering said call, diverting said caller to an options menu that allows said caller to send a callback message or leave a voice mail message, diverting said caller to an options menu that advises said caller to callback within a specified time frame and allows said caller to leave a voice mail message, and placing said call on hold;

receiving a selection of an option; and facilitating execution of the selected option.

14. A system in accordance with claim 13 wherein said callee availability is determined by callee status indicators that include free, busy and away.

15. A system in accordance with claim 14 wherein said callee status indicators are based on one or more of callee mobile device status, callee calendar activities, callee location and past callee behavior.

16. A system in accordance with claim 13 wherein said caller-callee relationships are determined by caller status indicators that include available, unavailable or restricted availability.

17. A system in accordance with claim 13 wherein said information exchange includes providing said caller with information regarding said callee's current and future availability and willingness to receive a voice call from said caller, and providing call handling options to said caller.

18. A system in accordance with claim 17 wherein said call handling options include sending a callback message to said callee and leaving a voice mail message.

19. A system in accordance with claim 13 wherein said call handling options include allowing said callee to change said callee availability and said caller-callee relationship.

20. A system in accordance with claim 13 wherein said information exchange includes one or more of interactive voice response menus, graphical menus and text menus.

21. A call management server for supporting non-intrusive and effective voice communication among mobile users, said system having a call manager operable to:

manage voice calls between mobile users based on callee availability and caller-callee relationships, and communication resources providing non-intrusive information exchange, including interactive exchange at the time of call setup but prior to the call being answered;

facilitate execution of a call-handling option, during the call setup and prior to the call being answered, according to a caller-callee relationship and the information exchange, wherein facilitating execution of the option comprises:

providing at least two options for handling a voice call;

receiving a selection of an option; and facilitating execution of the selected option;

said callee availability being determined by callee status indicators that include free, busy and away;

said callee status indicators being based on one or more of callee mobile device status, callee calendar activities, callee location and past callee behavior;

said caller-callee relationship being determined by caller status indicators that include available, unavailable or restricted availability;

said information exchange including providing said caller with information regarding said callee's current and future availability and willingness to receive a voice call from said caller, and providing call handling options to said caller;

said call handling options including sending a callback message to said callee, leaving a voice mail message and setting a callback alert that alerts said caller when said callee becomes available;

said information exchange including providing call handling options to said callee;

said call handling options including asking said caller if said call is urgent, answering said call, diverting said caller to an options menu that allows said caller to send a callback message or leave a voice mail message, diverting said caller to an options menu that advises said caller to callback within a specified time frame and allows said caller to leave a voice mail message, and placing said call on hold;

said call handling options including allowing said callee to change said callee availability and said caller-callee relationship; and said information exchange including one or more of interactive voice response menus, graphical menus and text menus.

22. A method for supporting non-intrusive and effective voice communication among mobile users, comprising:

receiving a call request to communicate with a callee;
determining an availability status of the callee;
determining a relationship status of a caller;
facilitating an information exchange between the caller and the callee during call setup and before the call request is completed to determine an action to be executed on the call request; and
facilitating execution of the action, during the call setup and before the call request is completed, according to the relationship status of the callee and the information exchange, wherein facilitating execution of the action comprises:

providing at least two actions for handling the call request, wherein the at least two actions comprise setting an alert that informs the caller of the availability status of the callee, determining whether the call request is urgent, accepting the call request diverting the call request to an interactive voice response (IYR) system, diverting the call request to the IVR system that provides a callback time within a specified time frame, and placing the call request on hold;

receiving a selection of an action; and
facilitating execution of the selected action.

23. The method of claim 22, wherein the availability status is a selected one of free, busy, and away.

24. The method of claim 22, wherein the relationship status is an availability status according to a caller-callee relationship, and is a selected one of available, unavailable, and restricted availability.

25. The method of claim 22, wherein facilitating execution of the action comprises facilitating execution of the action by the caller if the relationship status of the caller comprises a first relationship status.

26. The method of claim 25, wherein the at least two actions comprise:

communicating a callback message to the callee; and
allowing the caller to leave a voice mail message.

27. The method of claim 25, wherein the first relationship status comprises an unavailable relationship status.

28. The method of claim 22, wherein facilitating execution of the action comprises facilitating execution of the action by the callee if the relationship status of the caller comprises a second relationship status.

29. The method of claim 28, wherein the second relationship status comprises a selected one of a restricted availability relationship status and an available relationship status.

* * * * *